United States Patent [19]

Tanaka et al.

[11] Patent Number: 4,965,690
[45] Date of Patent: Oct. 23, 1990

[54] TAPE CASSETTE HAVING OUTER HOUSING LAYERS OF ELASTOMERIC MATERIAL

[75] Inventors: Kimio Tanaka, Saku; Haruo Shiba, Komoro, both of Japan

[73] Assignee: TDK Corporation, Japan

[21] Appl. No.: 287,842

[22] Filed: Dec. 21, 1988

[30] Foreign Application Priority Data

Dec. 24, 1987 [JP] Japan .................... 62-194827[U]
Mar. 7, 1988 [JP] Japan .................... 63-29214[U]

[51] Int. Cl.$^5$ ............................................. G11B 23/02
[52] U.S. Cl. ................................. 360/132; 242/199
[58] Field of Search ................ 360/132; 242/197–201

[56] References Cited

U.S. PATENT DOCUMENTS 4,791,503 12/1988 Yamamoto ..................... 360/132

Primary Examiner—A. J. Heinz
Attorney, Agent, or Firm—Wood, Phillips, Mason, Recktenwald & VanSanten

[57] ABSTRACT

A tape cassette including an upper and a lower half housing sections each of which is comprised of an inner housing layer and an outer housing layer formed integrally on the outer surface of the inner layer, the upper and lower half housing sections containing a tape and reels on which the tape is wound or unwound inside the inner housing layers and having guide members located close to the front end of the housing to guide the tape, characterized in that said outer housing layers are molded from a thermoplastic elastomeric material to impart anti-shock or vibration property.

5 Claims, 3 Drawing Sheets

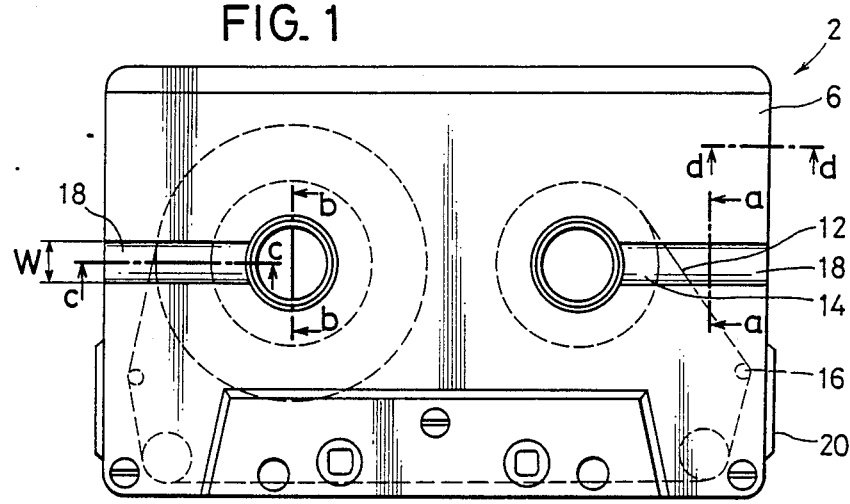
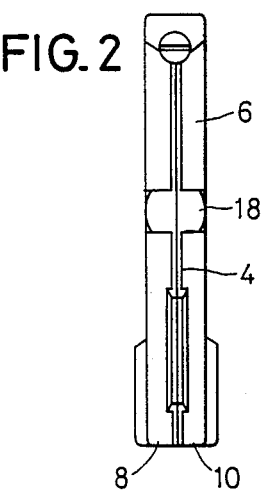
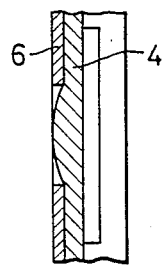
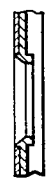
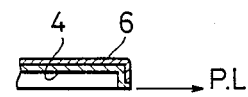

TAPE CASSETTE HAVING OUTER HOUSING LAYERS OF ELASTOMERIC MATERIAL

BACKGROUND OF THE INVENTION

This invention relates to a tape cassette, and more specifically to the structure of upper and lower half housing members of the cassette.

Conventional tape cassettes use cassette housings of varied structures. For example, as shown in FIG. 7, a housing 1 comprised of upper and lower half housing sections is fabricated from a single plastic material by injection molding. Another housing 5 in FIG. 10 is of a composite structure, with a metal plate member 3 affixed to a part of the outer surface of a plastic housing so as to increase the overall rigidity. Still another type is of a double-layer structure. For added molding accuracy, upper and lower half housing sections are each built from inner and outer layers of the same plastic material or a plastic layer and a metal layer.

The plastic or metallic materials heretofore employed for such tape cassettes usually are of low enough coefficients of friction to enhance particularly the running reliability of the tape. The cassettes, therefore, can be damaged when dropped carelessly while being handled inside an automobile, for example, for loading into or unloading from a car stereo. The cassettes of the character, when held within the vehicle or the like, tend to rattle in their cassette cases due to vibration of the automobile while running. The vibration, in turn, can result in scratching of the outer surface, seriously deteriorating the appearance of the tape cassette.

If the scratches are to be avoided, it is necessary to use a metal of high surface hardness or a high-hardness plastic material for the outer housing layer, but these materials are expensive. Where a metal is used, difficulties are involved in machining the piece for secure attachment to the housing body. The rattling or other noise can be precluded by laminating a layer of silicone rubber, neoprene rubber or the like to the housing surface. This involves bonding of rubber to the base, and the use of the bonding agent adds to the manufacturing cost and leads to deteriorated processability and processing accuracy.

SUMMARY OF THE INVENTION

The present invention, therefore, aims at providing a tape cassette of low cost and high processing accuracy which is protected against unintended drop during handling and is designed to decrease scratching of the outer surface and rattling due to vibration within an outer cassette case.

According to the present invention, a tape cassette is provided which includes an upper and a lower half housing sections each of which is comprised of an inner housing layer and an outer housing layer integrally formed on the outer surface of the inner layer, said upper and lower half housing sections containing a tape and reels on which the tape is wound or unwound inside the inner housing layers and having guide members located close to the front end of the housing to guide the tape, characterized in that said outer housing layers are molded from a thermoplastic elastomeric material. Said outer housing layers may be provided with windows.

With the construction described, the tape cassette of the invention offers the following advantages:

(1) The thermoplastic elastomeric material used in each outer housing layer is highly elastic and enables the outer layer to fit in well with the inner housing layer, limiting the warpage after molding of the housing to a minimum.

(2) The difficulties with the tape cassettes of the prior art structures are overcome, and a tape cassette of high processing accuracy is provided at low cost and by relatively simple processing.

(3) When used in an automobile, the tape cassette undergoes no deterioration in quality or appearance because no noise or surface scratching results from vibration of the vehicle while running. Additional advantage, though not limiting, is the following.

(4) Proper choice of the hardness and frictional coefficient of the thermoplastic elastomeric material precludes unintentional slip-off and minimizes the damage of the cassette if dropped.

BRIEF DESCRIPTION OF THE DRAWINGS

FIG. 1 is a plan view of a tape cassette embodying the invention;

FIG. 2 is a side view of the tape cassette of FIG. 1;

FIG. 3 is a fragmentary sectional view taken on the line I—I of FIG. 1;

FIG. 4 is a fragmentary sectional view taken on the line II—II of FIG. 1;

FIG. 5 is a fragmentary sectional view taken on the line III—III of FIG. 1;

FIG. 6 is a fragmentary sectional view taken on the line IV—IV of FIG. 1;

DESCRIPTION OF THE PREFERRED EMBODIMENT

Figure 7:
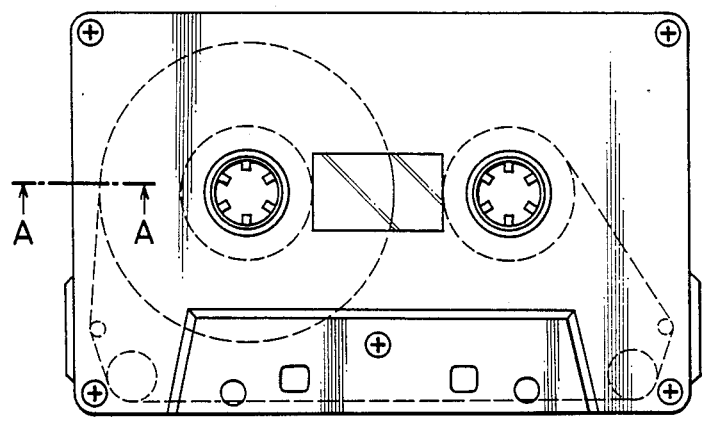
FIG. 7 is a plan view of a cassette of a conventional structure.
Figure 8:
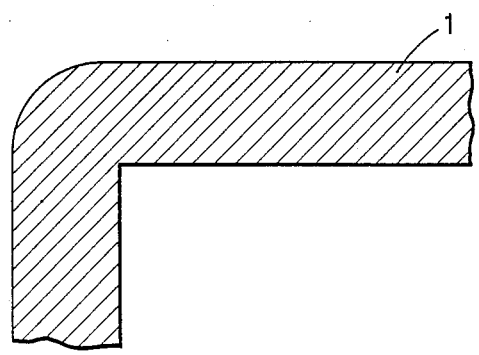
FIG. 8 is a fragmentary sectional view taken on the line VIII—VIII of FIG. 7.
Figure 9:
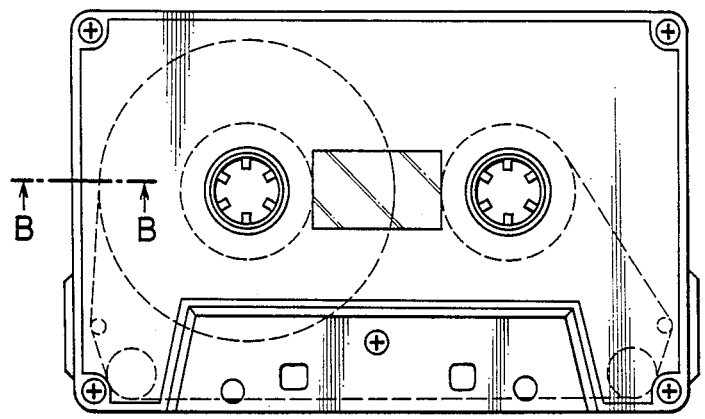
FIG. 9 is a plan view of a cassette of another conventional structure.
Figure 10:
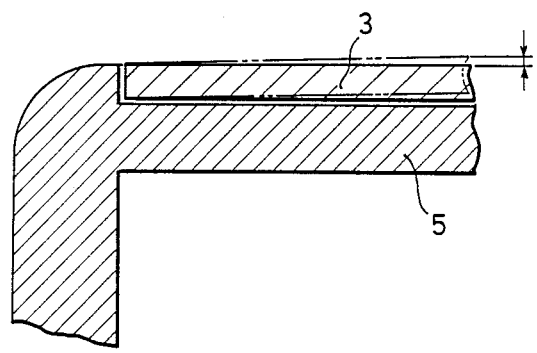
FIG. 10 is a fragmentary sectional view taken on the line X—X of FIG. 9.

The present invention will now be described in detail with reference to FIGS. 1 through 6. In FIG. 1 is shown as a plan view tape cassette 2 of the structure according to the invention. The tape cassette 2 comprises upper and lower half housing sections 8 and 10, each composed of an innner housing layer 4 and an outer housing layer 6. Inside the inner housing layers 4 of the upper and lower half housing sections, there are contained a length of tape 12 and a pair of reels 14 on which the tape is wound or unwound. On the front side of the reels are located guide members 16 for guiding the tape along a path from reel to reel. The upper and lower half housing sections 8 and 10 are fabricated in the following manner. First, a transparent (or possibly opaque if windows are not used) plastic material selected from the group consisting of polymethyl methacrylate (PMMA), acrylonitrile-styrene copolymer (AS), polycarbonate (PC), acrylonitrile-butadiene-styrene copolymer (ABS), polystyrene (PS), polybutylene terephthalate (PBT), high-impact polystyrene (Hi-PS), polyamide (PA) such as nylon and the like is primarily injection-molded in a die (not shown). Next, a thermoplastic elastomeric material chosen from among styrenic (e.g., a product of Asahi Chemical Industry Co. marketed under the trade designation of "Tuftec"), olefinic (e.g., "Milastomer" of Mitsui Petrochemical Co.), ester (e.g., "Hytrel" of Toray-Du Pont Co.), urethane (e.g., "Paraprene" of Nippon Polyurethane Ind. Co. or "Lezamin" of Dainichiseika Color & Chemicals Mfg. Co.), polyamide, polybutadiene, vinyl chloride, and other elastomeric materials, is secondarily injection-molded either partly or wholly over the outer surface of the primarily injection-molded inner housing layer to form an integral composite. A desirable combination of materials is nylon for the inner housing layer and polyurethane elastomer for the outer housing layer.

The following Table summarizes the bonding strength of the inner and outer layers of different materials. In the Table ◎ is strong bonding, ○ is good bonding, Δ is acceptable but weak bonding.

TABLE

| Inner | Outer Layer | | |
|---|---|---|---|
| layer | Polyurethanes | Polyamide | Polystyrene |
| PS | Δ | | Δ |
| Hi-PS | Δ | Δ | Δ |
| AS | ○ | ○ | ○ |
| ABS | ○ | ○ | Δ |
| PMMA | ○ | ○ | ○ |
| PC | ○ | ○ | ○ |
| PBT | ○ | ○ | ○ |
| PA | ○ | ○ | Δ |

In the illustrated embodiment, as best shown in FIG. 1, each inner housing layer 4 has protrusions of a given width W formed partly along the longitudinal centerline from the right and left side walls of the tape cassette 2 inwardly. Each outer housing layer 6, on the other hand, is formed by the injection molding of the thermoplastic elastomeric material uniformly over the entire surface of the inner layer except for the portions corresponding to the protrusions. Thus, upon conclusion of the molding, the protrusions of the inner housing layer constitute windows 8 of the given width W through which the tape 14 inside is visible from the outside. The surrounding edge walls of the inner housing layer 4 including lugs 20 on both side walls of the tape cassette housing, as shown in FIG. 2, are exposed to the outside of the housing. The surrounding edge walls and lugs 20 are thus contiguous to the windows 18 on the outer side of the cassette housing.

The tape cassette according to the invention, which uses a thermoplastic elastomeric material for the outer housing layers as described above, can be freely configured as desired to achieve further improvements in the functions and effects of the invention. The tape cassette of the invention is not solely intended for audio tapes but, of course, the invention is applicable to video tapes as well. Although a thermoplastic elastomer does not possess adequate mechanical rigidity, its combination with the inner housing layer material imparts sufficient mechanical strength to the resulting cassette housing to overcome the afore-described problems of the prior art cassettes.

Where a thermoplastic elastomer is used in fabricating a tape cassette, its hardness usually should range from the lower limit of 70 deg. and the upper limit of 98 deg. in terms of the A hardness scale of the Japanese Industrial Standards. Abrasion resistance of a thermoplastic elastomeric material generally can be increased by reducing its hardness. However, if the hardness is above or below the limits, the thermoplastic elastomer would deform to excess with too high modulus or conversely lose its texture or characteristics as such. Excessive abrasion resistance could also make it difficult to load the tape cassette onto or unload the same from the equipment that handles it. Unlike other common resins, thermoplastic elastomers can have a hardness suitably chosen for the intended use, and yet they fail to meet the compatibility requirements of tape cassettes, especially imperative for audio and video uses, with diverse types of equipment for recording and playback.

It has now been found that the development of the excessive abrasion resistance can be prevented by premixing the thermoplastic elastomeric material with from 5 to 60 percent by weight of a fluoroplastic and that this addition maximizes the advantages of the thermoplastic elastomeric material. Examples of fluoroplastics are a product of Daikin Kogyo Co. trade named "Lubron", "Nitoflon" of Nitto Kogyo Co., and "Tefzel" of Mitsui Fluorochemical Co.

Loading-unloading tests were conducted with tape cassettes on seven different types of car stereo. The test cassette housings were fabricated using three different thermoplastic elastomeric materials compounded with a fluoroplastic in predetermined proportions. The tests revealed that the following correlations hold between the thermoplastic elastomeric materials of varied hardnesses and the proportions of the fluoroplastic added, with some allowances made for the sake of safety:

| Thermoplastic elastomeric material | Fluoroplastic percentage (%) | Ease of loading & unloading |
|---|---|---|
| JIS hardness over 95 (high hardness type) | 0 | Poor |
| | 3 | Rather poor |
| | 5 | Good |
| JIS hardness 85–95 (medium hardness type) | 0 | Poor |
| | 10 | Rather poor |
| | 20 | Good |
| JIS hardness under 80 (low hardness type) | 0 | Poor |
| | 30 | Rather poor |
| | 60 | Good |

While the invention has been described in connection with a preferred embodiment thereof, it is to be understood that various modifications may be made without departing from the spirit and scope of the invention. It should be noted, however, that the portion of the cassette which is brought into sliding contact with the guide of the recorder at the time loading and unloading the cassette is not covered with thermoplastic elastomeric material, there is no necessity of using fluoroplastic material.

What is claimed is:

1. In a tape cassette having a housing, said housing having a front end and including upper and lower half housing sections each of which is comprised of an inner housing layer with an outer surface and an outer housing layer formed integrally on the outer surface of the inner housing layer, said upper and lower half housing sections defining a space between the inner housing layers for containing a tape and reels on which the tape is wound or unwound and having guide members located close to the front end of the housing to guide the tape, the improvement wherein the outer housing layers on the housing sections are molded from a thermoplastic elastomeric material.

2. A tape cassette according to claim 1 wherein said thermoplastic elastomeric material constituting said outer housing layers is mixed with from 5 to 60 percent by weight of a fluoroplastic.

3. A tape cassette according to claim 1 wherein said plastic material constituting said inner housing layers is selected from the group consisting of PA, PMMA, AS, PC, ABS, PS, Hi-PS, PBT and the like.

4. A tape cassette according to claim 1 wherein said inner and outer housing layers define top and bottom walls, one of said top and bottom walls having a predetermined thickness, said inner housing layers are formed at least partially of a transparent plastic material, there being a window in the outer layer in the one of the top and bottom walls into which the transparent plastic material extends, the transparent plastic material in the window having a thickness no greater than said predetermined thickness.

5. A tape cassette according to claim 1, wherein the thermoplastic elastomeric material is selected from the group consisting of styrenic elastomer, olefinic elastomer, polyester elastomer, polyurethane elastomer, polyamide elastomer, polybutadiene, and vinyl chloride elastomer.

* * * * *